United States Patent
Flachs

(10) Patent No.: US 8,307,233 B2
(45) Date of Patent: Nov. 6, 2012

(54) BUS-HANDLING

(75) Inventor: Victor Flachs, Rishon Lezion (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 0 days.

(21) Appl. No.: 13/324,004

(22) Filed: Dec. 13, 2011

(65) Prior Publication Data

US 2012/0166826 A1    Jun. 28, 2012

Related U.S. Application Data

(63) Continuation of application No. 12/315,769, filed on Dec. 5, 2008, now abandoned.

(51) Int. Cl.
*G06F 1/00* (2006.01)
(52) U.S. Cl. .................................................. 713/323
(58) Field of Classification Search ........... 713/300–340
See application file for complete search history.

(56) References Cited

U.S. PATENT DOCUMENTS

| | | | | |
|---|---|---|---|---|
| 4,835,737 A * | 5/1989 | Herrig et al. | 710/302 |
| 4,851,987 A * | 7/1989 | Day | 713/601 |
| 5,481,733 A * | 1/1996 | Douglis et al. | 713/324 |
| 5,584,030 A * | 12/1996 | Husak et al. | 713/300 |
| 5,586,270 A * | 12/1996 | Rotier et al. | 710/301 |
| 5,586,332 A * | 12/1996 | Jain et al. | 713/322 |
| 5,600,839 A * | 2/1997 | MacDonald | 713/322 |
| 5,638,083 A * | 6/1997 | Margeson | 345/10 |
| 5,649,212 A * | 7/1997 | Kawamura et al. | 713/324 |
| 5,659,762 A * | 8/1997 | Sawada et al. | 713/323 |
| 5,713,029 A * | 1/1998 | Kaiser et al. | 713/322 |
| 5,793,993 A * | 8/1998 | Broedner et al. | 710/106 |
| 5,798,667 A * | 8/1998 | Herbert | 327/573 |
| 5,903,601 A * | 5/1999 | Elnashar et al. | 375/220 |
| 5,954,819 A * | 9/1999 | Kenny et al. | 713/322 |
| 5,996,083 A * | 11/1999 | Gupta et al. | 713/322 |
| 6,021,506 A * | 2/2000 | Cho et al. | 713/601 |
| 6,055,591 A * | 4/2000 | Nordling | 710/69 |
| 6,122,749 A * | 9/2000 | Gulick | 713/324 |
| 6,418,324 B1 * | 7/2002 | Doviak et al. | 455/426.1 |
| 6,438,635 B1 * | 8/2002 | Date et al. | 710/113 |
| 6,467,042 B1 * | 10/2002 | Wright et al. | 713/320 |
| 6,496,938 B1 * | 12/2002 | Fry et al. | 713/322 |
| 6,892,332 B1 * | 5/2005 | Gulick | 714/55 |
| 7,032,117 B2 * | 4/2006 | Kolinummi et al. | 713/300 |
| 7,039,819 B1 * | 5/2006 | Kommrusch et al. | 713/322 |
| 7,069,359 B1 * | 6/2006 | Nishimoto | 710/100 |
| 7,254,724 B2 * | 8/2007 | Payne | 713/320 |
| 7,363,523 B2 * | 4/2008 | Kurts et al. | 713/320 |
| 7,386,738 B2 * | 6/2008 | Trappeniers et al. | 713/300 |
| 7,571,335 B2 * | 8/2009 | Lee | 713/330 |
| 7,734,942 B2 * | 6/2010 | Dahlen et al. | 713/323 |
| 7,774,631 B1 * | 8/2010 | Walton | 713/321 |
| 7,941,583 B2 * | 5/2011 | Titone et al. | 710/306 |
| 8,008,949 B1 * | 8/2011 | Kallam | 327/99 |
| 2004/0003311 A1 * | 1/2004 | Jones | 713/320 |
| 2006/0010333 A1 * | 1/2006 | Rhodes et al. | 713/330 |
| 2009/0204831 A1 * | 8/2009 | Cousson et al. | 713/322 |

* cited by examiner

*Primary Examiner* — Paul R Myers

(74) *Attorney, Agent, or Firm* — D. Kligler I.P. Services Ltd

(57) ABSTRACT

A processor, comprising a processing unit having an active state and a sleep state in which at least one of its sub-sections is inactive and a communication port adapted to receive signals from external units over a bus, which is configured to be not fully operative when the processor is in the sleep state. The processor additionally includes a bus monitoring unit configured to stall the bus responsive to identifying transmissions on the bus directed to the communication port, while the processing unit is in the sleep state and to indicate to the communication port that a transmission started while it was in the sleep state.

30 Claims, 3 Drawing Sheets

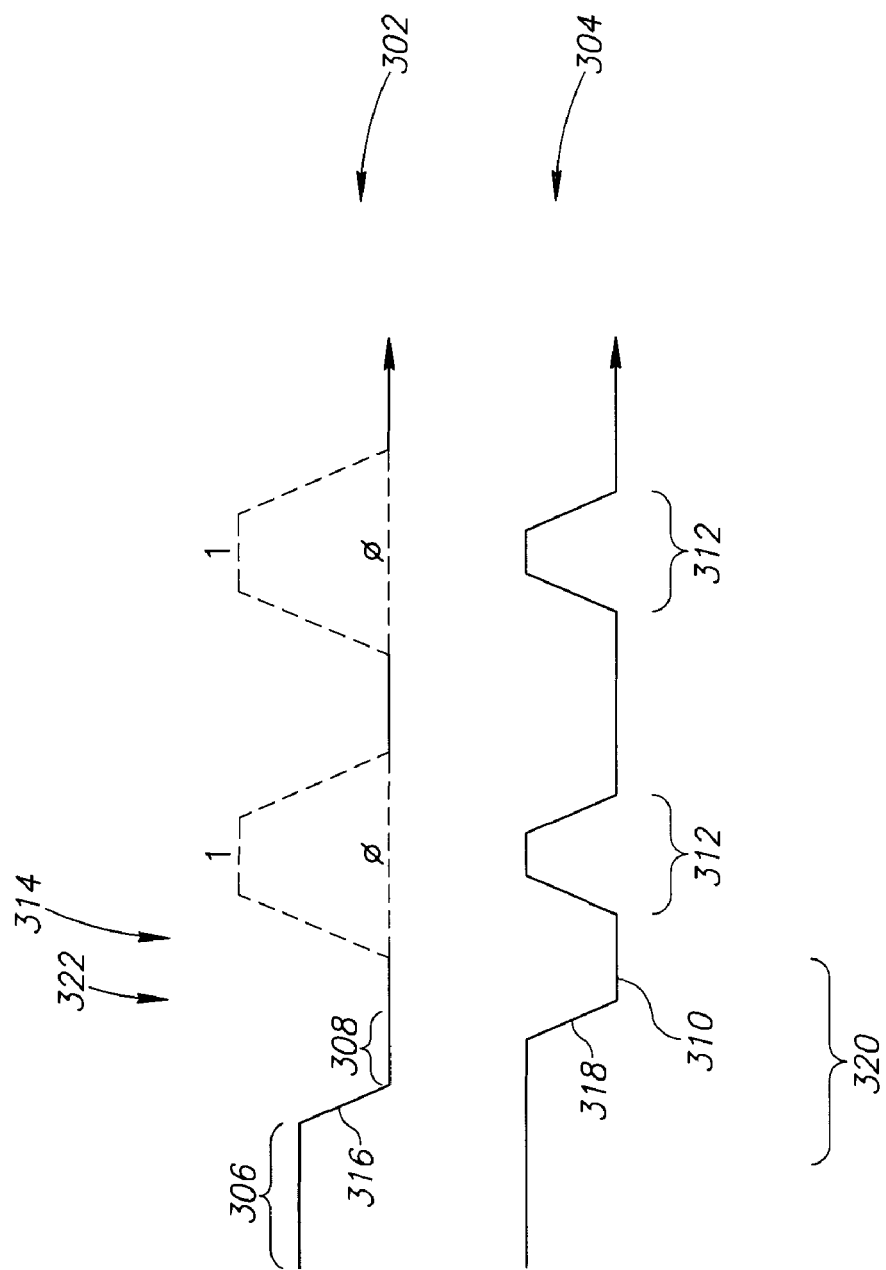

BUS-HANDLING

PRIORITY INFORMATION

The present invention claims priority to U.S. Utility application Ser. No. 12/315,769 filed on Dec. 5, 2008 now abandoned, making reference herein to same in its entirety.

FIELD OF THE INVENTION

The present invention relates generally to communications and specifically to wake-up procedures of communication devices.

BACKGROUND

Many computerized systems, such as portable computers, are battery operated and measures are taken to reduce their power consumption. One method used to reduce power consumption is shutting down units which are not currently in use. The unit which is shut down generally disables its clock and waits for a signal instructing it to wake up, i.e., to enter an active mode.

US patent publication 2008/0178026 to Chen, titled: "Computer System and Power Saving Method Thereof", the disclosure of which is incorporated herein by reference, describes a system in which when a chipset and a processor are in a power saving mode a bus connecting the chipset and processor is disabled. When the chipset needs to send data to the processor it enables the bus, transmits the data and then moves back to the sleep state.

EP patent 1 594 253 to Bogavac Davor, titled: "Method and Device to Wake-up Nodes in a Serial Databus", the disclosure of which is incorporated herein by reference, describes another system with nodes that wake up responsive to transmissions from a master unit, each unit waking up only for specific transmissions directed to it.

The waking up process may take time, referred to as a "wake up latency". In some cases, the source of transmitted data is not aware that the receiving unit is asleep and the sleeping unit is configured to wake up immediately when it identifies that signals are being transmitted on the bus. If the wake up latency is not sufficiently short, however, the sleeping unit will wake up only after at least part of the data from the source was transmitted and the transmission will be lost. While some sources may be configured to receive retransmission requests, other sources may not be so adapted and the data they transmit is permanently lost if the receiving unit does not awake fast enough.

U.S. Pat. No. 7,363,523 to Kurts et al., titled: "Method and Apparatus for Controlling Power Management State Transitions", the disclosure of which is incorporated herein by reference, suggests having a plurality of low power states for a processor, involving different extents of processor units shut down. When a bus signal is received, the processor does not move to a full scale operation state, but rather moves to an intermediate operation state which is sufficient to handle the bus access. The transition to the intermediate state is performed within 35 microseconds.

U.S. Pat. No. 7,039,819 to Kommrusch et al., titled: "Apparatus and Method for Initiating a Sleep State in a System on a Chip Device", the disclosure of which is incorporated herein by reference, suggests a state having a wake latency of about 1 microsecond.

Some processors, however, may not be able to wake up with a short enough latency, to catch the beginning of data transmitted on the bus.

US patent publication 2007/0239920 to Frid, titled: "Method and System for Communication Between a Secondary Processor and an Auxiliary Display Subsystem of a Notebook", the disclosure of which is incorporated herein by reference, suggests including a low power auxiliary display in a portable computer, which can be used instead of waking up the main processor and display of the computer. This solution, however, still requires substantial power amounts for the auxiliary display, and it would be desired to have a sleep state also for the auxiliary display in order to further reduce power consumption.

U.S. Pat. No. 6,892,332 to Gulick, titled: "Hardware Interlock Mechanism Using a Watchdog Timer", the disclosure of which is incorporated herein by reference, describes a system in which wake-ups are performed periodically and not responsive to external signals. Such a system is susceptible both to unnecessary wake ups and to delayed responses to external requests.

SUMMARY OF THE INVENTION

An aspect of some embodiments of the present invention relates to a bus monitoring unit, which is adapted to identify transmissions on the bus and to stall the bus responsive thereto in order to prevent transmissions thereon, until a device serviced by the bus monitoring unit is prepared to receive the transmissions.

In some embodiments of the invention, in addition to stalling the bus, the bus monitoring unit initiates a wake up of the serviced device, responsive to identifying the transmission on the bus.

When the serviced device is awake, the bus is released from the stalling. In some embodiments of the invention, before releasing the bus, the bus monitoring unit notifies the serviced device that it was stalled during a transmission, so that the serviced device adjusts itself to continue receiving the transmission that was stopped in the middle when the bus was stalled.

Alternatively or additionally, the bus monitoring device provides the serviced device with signals which imitate the beginning of a transmission which was missed while the serviced device was in the sleep mode, before the bus was stalled.

There is therefore provided in accordance with an exemplary embodiment of the invention, a processor, comprising a processing unit having an active state and a sleep state in which at least one of its sub-sections is inactive, a communication port adapted to receive signals from external units over a bus, which is configured not to be fully operative in the sleep state and a bus monitoring unit configured to stall the bus responsive to identifying transmissions on the bus directed to the communication port, while the processing unit is in the sleep state and to indicate to the communication port that a transmission started while it was in the sleep state.

Optionally, the bus monitoring unit is configured to provide a wakeup signal to the processing unit, responsive to identifying a transmission on the bus that is directed to the communication port. Optionally, the bus monitoring unit is configured to provide the wakeup signal and to stall the bus, substantially concurrently. Alternatively, the bus monitoring unit is configured to provide the wakeup signal before stalling the bus. Optionally, the bus monitoring unit comprises an asynchronous unit which identifies transmissions on the bus without use of a time signal. Optionally, the bus monitoring unit comprises a synchronous unit which identifies transmissions on the bus using a time signal. Optionally, the bus monitoring unit is configured to provide the communication port with an imitation of a beginning portion of a transmission from an external unit, before releasing the bus.

There is further provided in accordance with an exemplary embodiment of the invention, a method of handling transmissions, comprising identifying a transmission received over a bus, while a port intended to receive the transmission is in a sleep state, moving the port into an operative state and stalling the bus responsive to receiving the transmission, until the port is in the operative state. Optionally, the method includes notifying the port, when it is in the operative state, that a transmission began whilst said port was in the sleep state and/or locally providing an imitation of a beginning of the identified transmission to the port, after it moves into the operative state, before terminating the stalling of the bus.

BRIEF DESCRIPTION OF THE FIGURES

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 3 is a schematic illustration of signals transmitted on a bus, in accordance with an exemplary embodiment of the invention.

DESCRIPTION OF THE PREFERRED EMBODIMENTS

Overview

Figure 1:
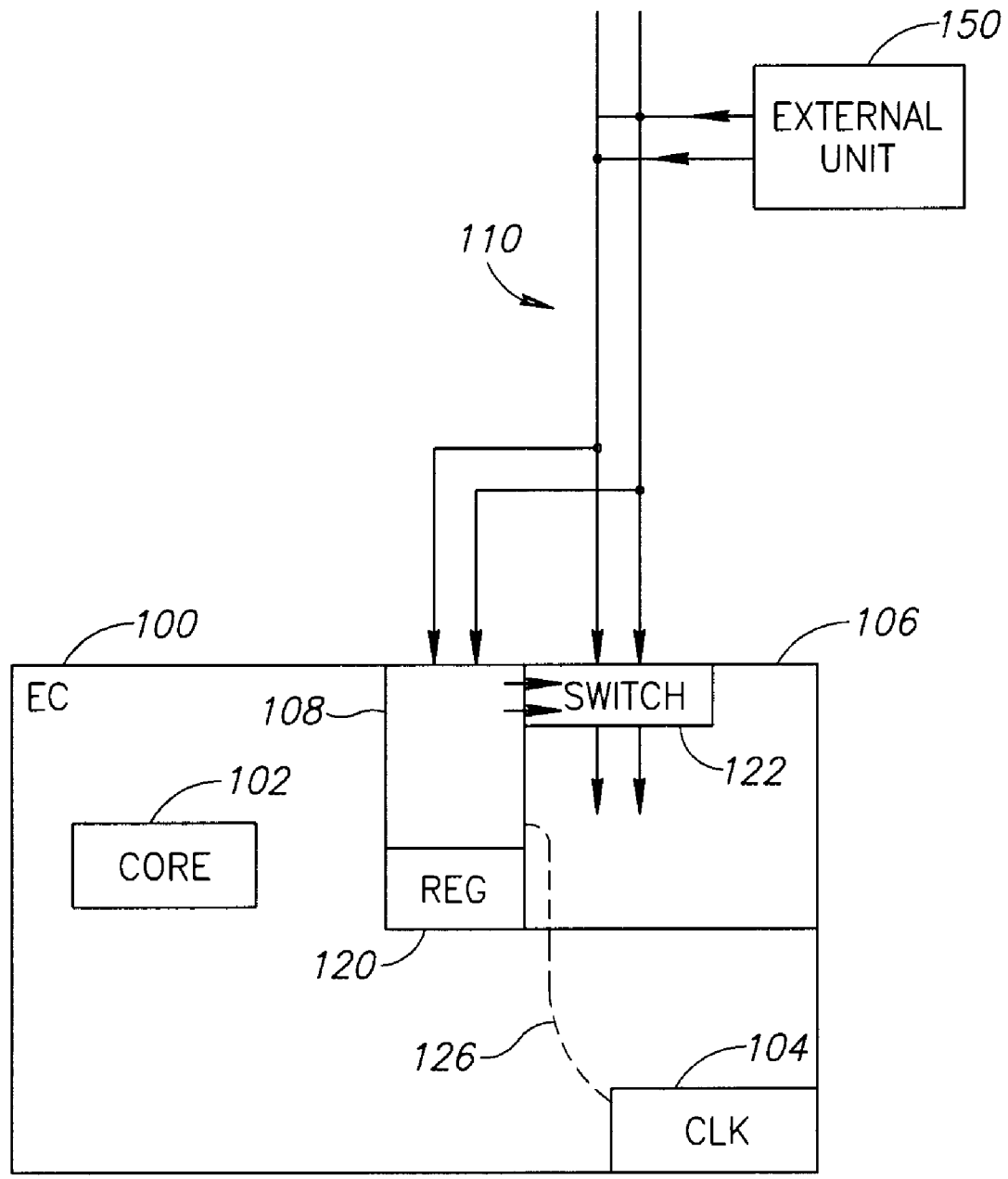
FIG. 1 is a schematic illustration of an embedded controller connected to an external unit via a bus, in accordance with an embodiment of the invention.

FIG. 1 is a schematic illustration of an embedded controller (EC) 100 connected over a bus 110 to an external unit 150, in accordance with an embodiment of the invention. Embedded controller 100 may be employed, for example, in a notebook computer, to perform control tasks of one or more peripherals, such as a keyboard, a mouse, a screen, a power supply and/or a battery (not shown). Embedded controller 100 includes a processing unit core 102 which manages its operation, and a clock signal generator 104, which provides a timing signal to the various sub-sections (not all of which are shown) of embedded controller 100. Controller 100 further includes an SM Bus port 106, which communicates with one or more external units 150, via bus 110.

In order to reduce power consumption, embedded controller 100 is configured to have a sleep state in which clock signal generator 104 is shut down. A start signal identifier 108 is configured to monitor the signals transmitted on bus 110 while EC 100 is in the sleep state. When in full operation, port 106 optionally handles detection of transmissions on its own and signal identifier 108 is not in use. When a transmission on bus 110 is identified, signal identifier 108 optionally sends a wake up signal 126 to clock 104 and in parallel stalls the transmission on bus 110, until port 106 is ready to receive the transmission, as is now described in detail.

Figure 2:
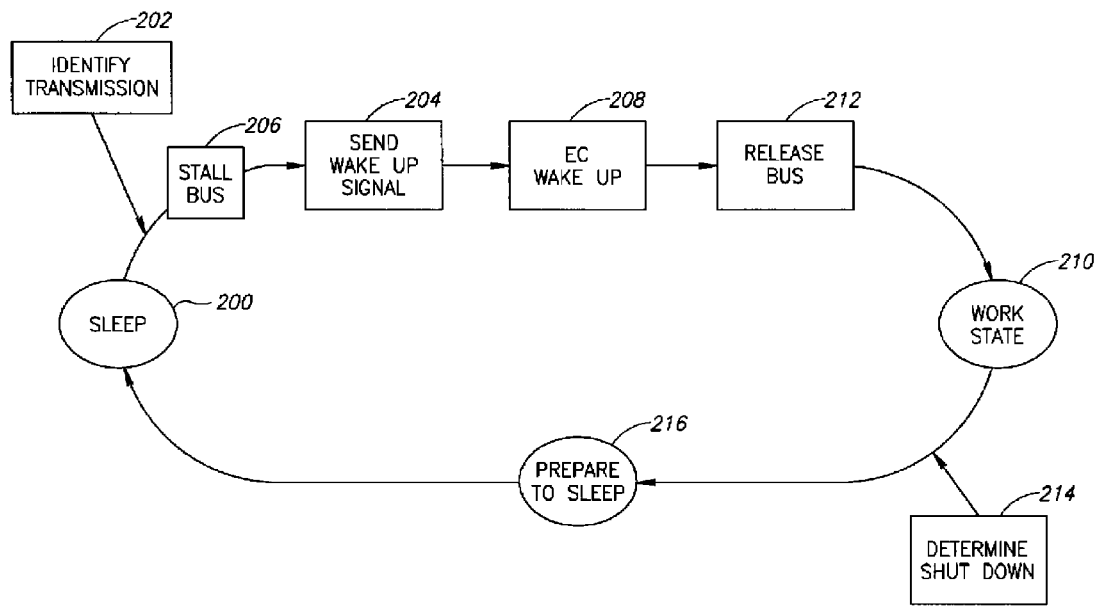
FIG. 2 is a state diagram of an embedded controller, in accordance with an exemplary embodiment of the invention.

FIG. 2 is a state diagram of EC 100, in accordance with an exemplary embodiment of the invention. When not active, EC 100 enters a sleep state 200 in which it consumes very little or no power. When a transmission on bus 110 is identified 202, signal identifier 108 stalls 206 bus 110 and optionally, in parallel or immediately thereafter, sends 204 a wake up signal to clock generator 104. Responsive to the wake up signal, EC 100 undergoes a wake up procedure 208. At the end of the wakeup procedure, signal identifier 108 releases 212 the bus and allows EC 100 to handle the incoming transmission and EC 100 enters a work state 210. When EC 100 is in work state 210 but it is determined 214 that it can be moved to the sleep state in order to reduce power consumption, EC 100 undergoes a prepare-to-sleep procedure 216 and moves into sleep state 200.

Identification

Referring in detail to identifying (202) a transmission on bus 110, in some embodiments of the invention, bus 110 is governed by a protocol which requires transmission of a predetermined start signal before transmitting data, and the identifying (202) involves identifying at least a portion of the start signal. In some embodiments of the invention, the identification is performed based on the signals on fewer than all the lines of the bus, for example on only a single line, such as only on the data line or only on the clock line of the bus. The extent of the portion to be identified is optionally selected during a design stage, based on a tradeoff between the competing requirements of more accurate identification and of minimizing the resources required for the identification.

Optionally, signal identifier 108 is an asynchronous unit which does not require a clock signal for its operation, so as to minimize its power consumption. Alternatively, signal identifier 108 is a synchronous unit which operates with a low rate clock signal, such that identification of signals can be based on durations of signal patterns, and consequently is generally more accurate. It will be appreciated that using a synchronous unit for the detection is particularly useful when the bus is expected to be relatively noisy, as it provides a more reliable detection in the presence of noise. Optionally, the low rate clock signal is nonetheless higher than twice the rate of transmission on bus 110, such that at least two low rate clock cycles are included in each slot 312, so that signals on the bus can be identified accurately. Alternatively, the low rate clock signal is at a rate lower than twice the bus rate, to reduce further the power consumption, although the determination of the signals on the bus may not be complete.

FIG. 3 is a schematic illustration of signals transmitted on bus 110, in accordance with an exemplary embodiment of the invention. In the embodiment of FIG. 3, bus 110 includes two lines, a data line which carries a data signal 302 and a clock line which carries a clock signal 304. When the bus is not in use, both bus lines remain at a high voltage level, as illustrated by time segment 306. At the beginning of each transmission, a start signal 320 is transmitted to indicate the beginning of a new transmission. In generating the start signal 320, the transmitter first changes the data signal 302 to a low voltage for a period 308 of a predetermined length. Thereafter, clock signal 304 is changed to a low voltage for a predetermined period 310. Once the transmission of start signal 320 is completed, bits are transmitted in a sequence of slots 312. In each slot 312, clock signal 304 is raised for a predetermined duration and then lowered, to indicate the timing of the slot. Data signal 302 in each slot either has a low voltage, representative of a '0' bit, or a high voltage, representative of a '1' bit.

With regard to the example of FIG. 3, signal identifier 108 optionally considers a transmission to be identified if a transition of data signal 302 to a low voltage is identified while clock signal 304 is high (e.g., transition 316), followed by transition of clock signal 304 to a low voltage while data signal 302 has a low value (e.g., transit 318). Alternatively, signal identifier 108 considers a transmission to be identified if clock signal 304 moves to a low value while data signal 302 has a low value. In another embodiment, signal identifier 108 considers a transmission to be identified if either clock signal 304 or data signal 302 moves to a low value. This alternative makes signal identifier 108 simpler, possibly at the expense of a higher rate of false transmission identification in the presence of substantial noise levels.

In embodiments in which signal identifier 108 is a synchronous unit, identification may depend on the duration for which clock signal 304 and/or data signal 302 are in a specific state. For example, an identification of a transmission may require that after transit of signal 302 from a high to low voltage, at least a predetermined period 308, or about a period 308, passes until clock signal 304 moves to a low voltage level.

Bus Stalling

Referring in detail to stalling (206) bus 110, the stalling is optionally performed by holding the clock line at a low level.

In some embodiments of the invention, the stalling (206) and the sending (204) of the wake up signal are performed simultaneously. In other embodiments, the stalling of the bus is performed after sending (204) the wake up signal, allowing the external unit 150 to proceed with the transmission until a predetermined desired point, without delaying the beginning of the wake up of controller 100. For example, with reference to FIG. 3, a wake up signal may be sent once point 322 is reached, while the bus is stalled only when point 314 is reached or even only after a predetermined number of slots 312. In one embodiment, the stalling is performed only after a first sequence of bits of the message, indicative of the address of the recipient, is received. In this embodiment, signal identifier receives this first sequence of bits and conveys its contents to port 106 when controller 100 is awake.

Optionally, both the sending (204) of the wake up signal and the stalling are performed by signal identifier 108. Alternatively, different units perform the wake up and the stalling. For example, the wake up may be performed by a watch dog circuit, for example such as described in U.S. Pat. No. 6,892,332, the disclosure of which is entirely incorporated herein by reference, modified to operate with controller 100. Signal identifier 108 is configured, in such cases, to stall bus 110 until the controller 100 wakes up. Optionally, when a transmission on bus 110 is identified, signal identifier 108 stalls the bus and sets a flag for the watch dog circuit. The next time the watch dog circuit operates, it checks if the flag is set and if so it wakes controller 100. The watch dog circuit optionally operates at a sufficient rate such that the wake-up occurs before the transmitter of external unit 150 times out.

Bus Release

Referring in detail to releasing 212 the bus 110, in some embodiments of the invention, controller 100 notifies signal identifier 108 when it has completed its wakeup process and following receipt of the notification, signal identifier 108 releases (i.e. un-stalls) bus 110. Alternatively, following stalling of the bus, signal identifier 108 monitors the status of controller 100 to determine when it wakes up. Further alternatively, following the sending of the wakeup signal, signal identifier 108 waits a predetermined period which is required for the wakeup and thereafter it releases the bus, without verifying with controller 100 that it is awake.

In some embodiments of the invention, after bus 110 is released from being stalled, external unit 150 retransmits the whole stalled message from the beginning, including the predetermined start signal. In such embodiments, once the bus is released from being stalled, port 106 receives the transmitted message as any transmission received while controller 100 is in the awake state, without need for special provisions due to the stalling of the bus.

In other embodiments, when bus 110 is released, external unit 150 continues to transmit from the point at which it stopped due to the stalling. For example, if the bus was stalled at the time point 314 (FIG. 3), external unit 150 will resume transmission from point 314. As port 106 only moves to the operative state after the bus was stalled, the information transmitted before the bus was stalled was not received by port 106. Therefore, when signal identifier 108 stalls bus 110 in the middle of a transmission, it optionally sets a flag, for example, in a register 120. When port 106 wakes up it checks register 120 to determine whether a transmission is already in progress. If register 120 indicates that a transmission was in progress, port 106 adjusts itself internally as if it had just received the predetermined start portion of the message, transmitted before the bus was stalled.

Alternatively, in order not to require configuration of port 106 for implementation of the present invention, signal identifier 108 provides port 106 with signals which imitate the start signals missed by port 106 due to its being in the sleep state. Optionally, upon determining that controller 100 is awake, before releasing bus 110, signal identifier 108 sets a switch 122 to disconnect port 106 from bus 110 and to connect it instead to signal identifier 108. Signal identifier 108 then internally transmits to port 106, the portion of the start signal missed because port 106 was asleep. After providing the missed portion of the start signal, signal identifier 108 releases the bus 110 and sets switch 122 to reconnect port 106 to the bus.

In some embodiments of the invention, signal identifier 108 includes a synchronous portion and an asynchronous portion. The asynchronous portion identifies transmissions on bus 110 while controller 100 is in a sleep state, and the synchronous portion generates the missed portion of the start signal.

Optionally, the time required for wake up of port 106 and the stalling period are shorter than the time-out period of external unit 150. In some embodiments of the invention, at wake-up, signal identifier 108 determines whether external unit 150 timed out and accordingly determines whether to notify port 106 that the predetermined start portion of the message was already received while it was asleep. If the external portion has already timed-out, such a notification is not provided.

END REMARKS

While the above description relates to an SM bus, the principals of the invention may be applied to other buses which may be stalled by the receiver. For example, while in the above description the bus is considered idle when it carries a high voltage level, in other embodiments a bus considered idle when it has a low voltage, is used. While the above description relates to a controller of a note book computer, the invention may be implemented in other device using a suitable bus.

Signal identifier 108 may be configured to operate at all times, or may be disabled by a user in hardware and/or software, at the time of system configuration. Alternatively or additionally, a user may disable signal identifier 108 at any time in which controller 100 is in the operative state. In some embodiments of the invention, signal identifier 108 automatically moves between an operative and inoperative state without user intervention. Optionally, in such embodiments, in prepare-to-sleep procedure 216, signal identifier 108 is awakened and signal identifier 108 is disabled when controller 100 moves into its operative state.

It will be appreciated that the above described description of methods and apparatus are to be interpreted as including apparatus for carrying out the methods and methods of using the apparatus. It should be understood that, where appropriate, features and/or steps described with respect to one embodiment may be used with other embodiments and that not all embodiments of the invention have all of the features and/or steps shown in a particular figure or described with respect to a specific embodiment.

It is noted that at least some of the above described embodiments may include non-limiting details which were provided by way of example for illustration purposes and/or to describe the best mode contemplated by the inventors and therefore may include structure, acts or details of structures and acts that are not essential to the invention. Structure and acts described herein are replaceable by equivalents known in the art, which perform the same function, even if the structure or acts are different. Many alternative implementation details may be used. Therefore, the scope of the invention is limited only by the elements and limitations as used in the claims, wherein the terms "comprise," "include," "have" and their conjugates, shall mean, when used in the claims, "including but not necessarily limited to."

I claim:

1. A data controller system configured to operate in active and sleep modes, said data controller system having interfaces to receive external signals over an external bus, said data controller system comprising:
   a) a core processor configured to operate alternatively in an active mode and in a sleep mode, wherein during said sleep mode at least a portion of said core processor is deactivated;
   b) a communications port operatively connected to said core processor and said external bus, wherein said communications port is alternatively operable to be in an active mode and a sleep mode; and
   c) a signal identifier unit connected to said external bus, and configured to continuously monitor for external signals on said external bus, wherein said signal identifier unit is operable to stall receipt of said external signals on said external bus at said communications port responsive to identifying external signals on said external bus when said communications port is in said sleep mode, said signal identifier unit being operable to wake said core processor, and said signal identifier unit being operable to wake said communications port into said active mode responsive to at least receipt of said external signals on said external bus.

2. The data controller system of claim 1, wherein the signal identifier unit is operable to provide a wake up signal to said communications port after said core processor enters said active state.

3. The data controller system of claim 2, wherein said signal identifier unit is operable to provide a wake up signal to said core processor and to stall receipt of said external signals on said external bus operably connected to said communications port substantially concurrently.

4. The data controller system of claim 3, wherein said signal identifier unit comprises an asynchronous unit which is operable to identify transmissions on said external bus without use of a timing signal.

5. The data controller system of claim 3, wherein said signal identifier unit comprises an asynchronous unit which identifies external signals on said external bus using a timing signal.

6. The data controller system of claim 3, wherein said signal identifier unit is operable to provide said communications port with a simulation of a beginning portion of said external signals before releasing said external bus to transmit said external signals to said communications port.

7. The data controller system of claim 3, wherein said signal identifier unit is configured to stall said external bus at a specific point in a transmission of identified external signals on said external bus.

8. The data controller system of claim 3, wherein said signal identifier unit is operable to stall said external bus by holding a clock line of said external bus at a level preventing transmission of external signals on said external bus to said communication port.

9. The data controller system of claim 1, wherein external units generating external signals on said external bus operatively connected to said communication port are unaware of said active mode and said sleep mode of said data controller system.

10. A method of operating a data controller system comprising a core processor for handling receipt of external signals via at least one external bus connected to said data controller system at a communication port, said method comprising:
   a) placing at least said core processor and said communication port in a sleep mode;
   b) detecting an incoming external signal on said external bus using the signal identifier unit remaining in an active mode in said processing system;
   c) responsive to said incoming external signal, operating said signal identifier unit to stall receipt of said incoming external signal at said communication port;
   d) responsive to said incoming external signal, operating said signal identifier unit to send an activation signal to place said sleeping core processor in said active mode;
   e) responsive to activation of said core processor, operating said signal identifier unit to place said communication port in said active mode; and,
   f) operating said signal identifier unit to permit transmission of said incoming external signal to said communication port.

11. The method of claim 10, further comprising the step of:
   g) notifying said communication port after it is placed in said active mode that transmission of external signals began while said communication port was in said sleep mode.

12. The method of claim 11, further comprising the step of:
   h) providing at said communication port an imitation of a beginning of an identified transmission of said external signals to said communication port, after said communication port is moved into said active state.

13. The method of claim 12, wherein said imitation of said identified transmission is provided to said communication port before releasing stalling of said external bus.

14. A processor, comprising:
   a processing unit having an active state and a sleep state in which at least one of the sub-sections of the processing unit is inactive;

a communication port adapted to receive signals from external units over a bus, which is configured not to be fully operative in the sleep state; and a bus monitoring unit configured to stall the bus responsive to identifying transmissions on said bus directed to the communication port, while the processing unit is in the sleep state and to indicate to the communication port that a transmission had started while the port was in the sleep state.

15. A processor according to claim 14, wherein the bus monitoring unit is configured to provide a wakeup signal to the processing unit, responsive to identifying a transmission on the bus that is directed to the communication port.

16. A processor according to claim 14, wherein the bus monitoring unit is configured to provide the wakeup signal and to stall the bus, substantially concurrently.

17. A processor according to claim 14, wherein the bus monitoring unit is configured to begin stalling the bus only after providing the wakeup signal.

18. A processor according to claim 14, wherein the bus monitoring unit comprises an asynchronous unit which is adapted to identify transmissions on the bus without use of a time signal.

19. A processor according to claim 14, wherein the bus monitoring unit comprises a synchronous unit which identifies transmissions on the bus using a time signal.

20. A processor according to claim 14, wherein the bus monitoring unit is configured to provide the communication port with an imitation of a beginning portion of a transmission from an external unit, before releasing the bus.

21. A method of handling transmissions, comprising:

identifying, by a bus monitoring unit, a transmission received over a bus, while a port intended to receive the transmission is in a sleep state;

moving the port into an operative state, by the bus monitoring unit; and stalling the bus responsive to identifying the transmission on the bus, by the bus monitoring unit, until the port is in the operative state.

22. The method of claim 21, comprising notifying the port, when it is back in the operative state, that a transmission began whilst the port was in the sleep state.

23. The method of claim 21, comprising providing locally an imitation of a beginning of the identified transmission to the port, after it moves into the operative state, before releasing the stalling of the bus.

24. A method according to claim 21, wherein stalling the bus comprises holding a line of the bus at a fixed level.

25. A method according to claim 24, wherein stalling the bus comprises holding a clock line of the bus at a fixed level.

26. A method according to claim 21, wherein identifying, by a bus monitoring unit, a transmission received over a bus comprises identifying a transmission from a transmitter not aware whether the port is in the sleep state.

27. A processor according to claim 14, wherein the bus monitoring unit is configured to stall the bus at a specific point in the identified transmission.

28. A processor according to claim 14, wherein the bus monitoring unit is adapted to stall the bus by holding a line of the bus at a fixed level.

29. A processor according to claim 27, wherein the bus monitoring unit is adapted to stall the bus by holding a clock line of the bus at a fixed level.

30. A processor according to claim 14, wherein the external units from which the communication port is adapted to receive signals over the bus, are not aware whether the processing unit is inactive.

* * * * *